United States Patent
Van Zutphen et al.

[11] 3,814,291
[45] June 4, 1974

[54] AUTOMATIC BULK TANK CLEANSING SYSTEM

[75] Inventors: Clement J. Van Zutphen, Eau Claire, Wis.; Brian J. Moran, Minneapolis, Minn.

[73] Assignee: Cotswold Dairy Equipment U.S.A. Ltd., Whitney, Oxon, England

[22] Filed: Sept. 20, 1972

[21] Appl. No.: 290,762

[52] U.S. Cl. .............................................. 222/148
[51] Int. Cl. ............................................... B08b 9/08
[58] Field of Search ............ 222/148, 149, 151, 21; 200/81.9

[56] References Cited
UNITED STATES PATENTS
3,469,528  9/1969  East .............................. 200/81.9 R
3,498,502  3/1970  Breitenstein et al. ............ 222/148 X
3,570,717  3/1971  Olson ................................. 222/148

*Primary Examiner*—Stanley H. Tollberg
*Attorney, Agent, or Firm*—Fleit, Gipple & Jacobson

[57] ABSTRACT

Apparatus to be used in cleaning the interior of a bulk milk tank comprises a water supply tank and a pump adapted to pump water in the supply tank through a spinner located in the tank to be cleaned. Means for mixing a concentrated iodophor sanitizer with the water in the supply tank is provided upstream of the pump so that the pump already filled with water first pumps water through the spinner and thereafter automatically pumps an aqueous chemical wash solution through the spinner. An automatic timing mechanism is provided for starting and stopping the pump, the timing mechanism being originally actuated manually with shut off being accomplished when all the water in the supply tank has passed through the pump.

19 Claims, 1 Drawing Figure

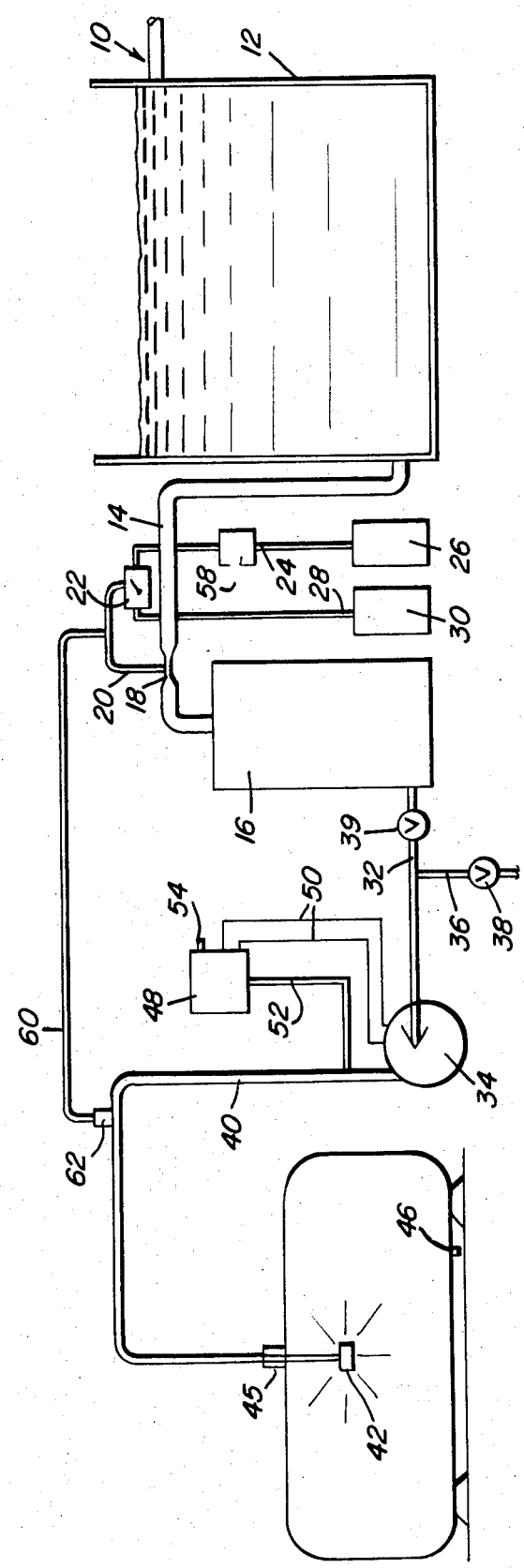

AUTOMATIC BULK TANK CLEANSING SYSTEM

BACKGROUND OF THE INVENTION

The present invention relates to a process and apparatus useful for cleaning the interiors of bulk fluid holding tanks, and especially milk holding tanks employed in the dairy industry.

In many industries, it is often necessary that fluid holding tanks be completely cleaned after each unfilling operation so that no contamination of fluid newly filled into a tank occurs.

For example, in the dairy industry, it is common practice for the dairy farmer to store up to two days supply of milk obtained after each morning and evening milking in specially designed bulk milk holding tanks. After the two day holding period, the milk is usually withdrawn from the farmer's tank and transferred to a large capacity dairy truck for transport to the dairy. Because the microorganisms inherently contained in milk grow so fast, health reasons dictate that the bulk milk tanks be thoroughly cleaned after each emptying operation. If this were not done, residual milk coating the bulk milk tank interior sides after emptying would infest the newly added milk with large amounts of bacteria and microorganisms, and consequently the overall microorganism content of the newly added milk would be prohibitively high after its two day holding period.

At the present time, the only practical method for cleaning the interior of a bulk milk holding tank is hand scrubbing. Either ordinary soap or various "iodophor sanitizers," which as is known in the art, are aqueous solutions containing complexes of phosphoric acid, iodine and various surfactants, are commonly employed as cleaners for this purpose, and as a result of such scrubbing, contamination of milk newly added to bulk milk tanks by residual milk contained therein is substantially prevented.

While hand scrubbing substantially prevents milk contamination by the bulk holding tank, it is time consuming and is comparatively expensive. As a consequence, a number of systems have been developed in the prior art to effect bulk tank cleaning without hand scrubbing. In this regard note, for example, U.S. Pat. Nos. 3,448,742, 3,589,378, 3,236,248, 3,583,412 and 2,432,584, each of which discloses systems and apparatus for cleaning bulk milk storage tanks.

While these prior art systems for bulk milk tank cleaning are effective at least to some degree, they have not found wide commercial acceptance. Unfortunately, most apparatus systems available at this time are simply unable to clean the milk tank interiors as cleanly as desired. Consequently, it is still necessary when employing these systems to hand scrub the milk tank interiors at regular intervals. In addition, many of the automatic and/or semi-automatic apparatus systems which have been developed employ many stepped processes requiring the use of comparatively involved equipment. Even though some of these systems do a comparatively good job of tank cleaning, the complicated apparatus involved makes the cost of employing these systems economically unfeasible.

Accordingly, it is the object of this invention to provide a method and apparatus for cleaning the interiors of all types of bulk storage tanks and especially milk bulk storage tanks.

It is another object of this invention to provide an apparatus for bulk tank cleaning operations which is of comparatively simple design and very easy to operate.

It is still a further object of this invention to provide a method and apparatus for cleaning the interiors of bulk storage milk tanks which is so effective that occasional hand scrubbing of the tank interiors is totally unnecessary.

SUMMARY OF THE INVENTION

These and other objects are accomplished according to the present invention which is based on discovery that by subjecting the interior of an empty milk storage bulk tank to a first 35 to 40 second water rinse followed by a chemical wash immediately after milk is withdrawn and thereafter subjecting the empty milk tank to a second 35 to 40 second water rinse followed by a second chemical rinse immediately before additional milk is filled into the tank, the bacteria and microorganisms on the bulk milk tank interior surfaces are so destroyed that contamination of newly added milk is substantially prevented.

Accordingly, the present invention provides a unique apparatus for carrying out the aforementioned process which is far simpler and much more efficient in construction and operation than apparatus systems employed prior to this time for cleaning bulk storage tanks. In particular the inventive apparatus comprises a water supply tank and a pump adapted to pump the water in the supply tank through a spinner located in the tank. Means for mixing concentrated iodophor wash chemicals with the water flowing from the supply tank is provided upstream of the pump so that the pump originally filled with water first pumps water through the spinner and thereafter automatically pumps an aqueous chemical wash solution through the spinner. An automatic timing mechanism responsive to the pump output pressure is provided for starting and stopping the pump, the timing mechanism being originally actuated manually with shut off being accomplished when all the water in the supply tank has passed through the pump.

In operation, after the spinner is inserted into the interior of the bulk milk tank and with the supply tank pump and intermediate conduits filled with water, the operator manually actuates the timing mechanism, and water downstream of the mixing means is drawn through the pump and into the spinner. As water upstream of the mixing means flows from the supply tank past the mixing means, an amount of concentrated iodophor wash composition is mixed with the water to form an aqueous chemical washing solution. The wash solution simply follows the water originally downstream of the mixing station as it flows through the apparatus and consequently the aqueous wash solution is automatically drawn through the pump and forced out of the spinner when the rinse water in the apparatus has been exhausted. After all the water in the supply tank has been mixed with concentrated wash chemicals and passed through the pump, the pump fills with air. The pump output pressure is therefore significantly reduced, and consequently, the automatic timing mechanism sensing this pressure decrease shuts off the pump to end the treatment cycle.

Because mixing of the concentrated wash chemicals together with water to form an aqueous wash solution is accomplished upstream of the pump, and because the pump and connecting conduit are initially filled with water, the proper time sequencing of tank rinsing followed by chemical washing can be accomplished automatically without the use of valves or other complicated timing mechanisms. In addition, because deactivation of the pump is dependent upon the pump downstream pressure, and because a water supply tank having a predetermined volume is employed, automatic shut-off of the pump and hence cessation of the operation of the machine is accomplished when desired, simply and easily, also without intricate or involved timing mechanisms.

BRIEF DESCRIPTION OF THE DRAWINGS

The present invention may be better understood by reference to the drawing which schematically illustrates the inventive apparatus.

DETAILED DESCRIPTION

The present invention contemplates a bulk tank cleansing system employing an apparatus adapted to subject the interior of a bulk milk holding tank to a two cycle cleansing operation. In particular when a bulk milk holding tank is cleaned according to the present invention, the tank interior is first subjected to a first water rinse for about 35 to 40 seconds and immediately thereafter a first chemical wash for about 80 to 85 seconds, the whole first cycle lasting about 2 minutes. Thereafter, the tank is left undisturbed until immediately before additional milk is to be added to the tank, at which time the tank interior is subjected to a second water wash also lasting about 35 to 40 seconds and a second chemical wash also lasting about 80 to 85 seconds. This procedure substantially completely eliminates objectionable microorganisms and bacteria from the bulk milk tank interior so that additional milk can be filled into the tank without contamination.

The particular chemicals employed in both the first and second chemical washes are iodophor sanitizers, which as indicated above are well known in the art. In carrying out the process according to the present invention, any of these known iodophor sanitizers can be used.

In a preferred embodiment of the present invention, "Cots-O-Dine" Cleaner which as known in the art as a proprietary composition of the Sep-Ko Chemicals Corporation of Minneapolis, Minn., and which contains phosphoric acid, isopropyl alcohol and nonylphenoxpolyethoxyethanol-iodine complexes is employed when diluted with water as the iodophor liquid in the first chemical wash.

In order to carry out the above-described process, the inventive apparatus is provided, the construction of which takes the following form. Referring to the drawing, a water inlet line from a water source (not shown) is connected to water supply tank 12. A conventional liquid level control mechanism (not shown) is attached to inlet line 10 and water supply tank 12 so that the liquid level in the tank does not exceed a predetermined height. A water delivery conduit 14 is connected at one end to a lower portion of water supply tank 12 and at its 109 and other end to mixing tank 16. As shown in the FIGURE, mixing tank 16 and water delivery pipe 14 are positioned vertically below the liquid level in supply tank 12 when filled. Consequently, mixing tank 16 and water delivery line 14 are completely filled with water when supply tank 12 is filled to the predetermined liquid height.

Intermediate its ends, water deliver conduit 14 is narrowed in a portion so that an aspirator 18 is formed. An iodophor delivery line 20 is connected at one end to aspirator 18 and at its other end to manually operated three way valve 22. Iodophor conduit 24 connects first cycle iodophor reservoir 26 to three way valve 22, and in a similar manner iodophor conduit 28 connects second cycle iodophor reservoir 30 to three way valve 22.

Connected to a lower portion of mixing tank 16 is conduit 32 which is adapted to transport liquid in mixing tank 16 to pump 34. Pump 34 is selected so that it can pump water out of water tank 12 faster than the tank is filled from the water source through inlet line 10, and any conventional type of pump can be used. An optional auxiliary conduit 36 is also fluidly connected to conduit 32, and a valve 38 is attached to auxiliary conduit 36, valve 38 normally being closed. Also attached to conduit 32 is an optional valve 39, which remains open during normal operation.

Attached to the fluid outlet port of pump 34 is a delivery conduit 40 which transfers fluid from pump 34 to a spinner 42. A portion of delivery conduit 40 is preferably flexible so that spinner 42 can be easily placed through an opening 45 in a conventional bulk milk holding tank 44 so that fluid sprayed by spinner 42 will clean the interior of the tank. As shown in the drawing, bulk milk holding tank 44 is provided with drain 46 so that fluid filled into the tank can be removed by gravity.

In a preferred embodiment an optional venting conduit 60 is fluidly connected between iodophor delivery line 20 and delivery conduit 40, and a conventional check valve 62 is provided to prevent any fluid flow between venting conduit 60 and delivery conduit when pump 34 is operating.

In order to control the operation of the inventive apparatus, timer switch 48 adapted to electrically connect and disconnect a power source (not shown) to the motor driving pump 34 by means of electrical leads 50 is provided. Also attached to switch 48 is a pressure indicating line 52 which is attached at its other end to delivery conduit 40. Pressure indicating line 52 is provided simply to enable the fluid pressure in delivery conduit 40 to be sensed by switch 48, and consequently there is no positive displacement of fluid through this tube when the pump operates. In addition, when positioned as shown in the FIGURE so that a portion of pressure indicating line 52 descends vertically from switch 48, the vertical portion of the pressure indicating line remains filled with air.

The particular switch 48 employed in the inventive apparatus is adapted to independently close the power-pump circuit in two independent ways. First, the switch will close the circuit if and when, that is only during the time when, it is independently actuated, such as by depressing button 54. In addition, switch 48 is adapted to close the power-pump circuit when the pressure in pressure indicating line 52 reaches a predetermined value. Such switches are known in the art, and any such switch can be used in the inventive apparatus. A particular switch which has been found to be especially useful, however, is known in the trade as a "Low Pressure Cut-Out Switch" Type 35–15–ARB manufactured by Control Manufacturing Co., St. Paul, Minn.

The operation of the inventive apparatus will now be described. After the water source is connected to water inlet line 10, tank 12 fills with water, and because of their positioning, water delivery conduit 14, mixing tank 16 and conduit 32 also fill with water. First cycle iodophor reservoir 26 is filled with concentrated iodophor sanitizing chemicals, preferably Cots-O-Dine cleaner, and second cycle iodophor reservoir 30 is filled with a conventional concentrated iodophor sanitizer so that the apparatus is ready for operation.

After milk in bulk milk holding tank 44 is withdrawn through drain 46, the free end of delivery conduit 40 carrying spinner 42 is placed into opening 45 of the milk tank. Three way valve 22 is then set so that iodophor delivery line 20 is in fluid communication with iodophor conduit 24. Button 54 on switch 48 is then depressed so that the electrical connection between pump 34 and the pump power source is made and the pump begins to run.

As soon as pump 34 begins to run, water is drawn from mixing tank 16 through conduit 32 into the pump. In addition, water in water supply tank 12 is transferred to mixing tank 16 by means of water delivery conduit 14. Because pump 34 pumps water out of water supply tank 12 faster than water enters water supply tank 12, the liquid level in water supply tank 12 begins to recede.

After a short period of operation, water pressure in delivery conduit 40 builds to a predetermined value, and consequently timer switch 48 now keeps pump 34 and the pump power source electrically connected by itself, mechanical depression of button 54 being unnecessary.

As water from water supply tank 12 flows through water delivery conduit 14 into mixing tank 16, it passes aspirator 18 where a partial vacuum is created. As a result, Cots-O-Dine cleaner or other iodophor liquid in first cycle iodophor reservoir 26 is drawn through iodophor conduit 24 and iodophor delivery line 20 into water delivery conduit 14 where it is mixed with water to form an aqueous iodophor wash solution. This wash solution fills into mixing tank 16 as water originally in mixing tank 16 is pumped out. This continues until after a predetermined period of operation, preferably about 35 to 40 seconds, at which time mixing tank 16 is totally filled with the aqueous wash solution.

Once mixing tank 16 is completely filled with aqueous wash solution, pump 34 automatically begins to pump this wash solution through delivery conduit 40 and spinner 42 into bulk milk holding tank 44, valve switching or other apparatus change being wholly unnecessary.

As pump 34 continues to pump the aqueous wash solution from mixing tank 16 through spinner 42, the liquid level in water supply tank 12 continuously decreases. After a predetermined period of operation, usually between about 90 and 105 seconds after the pump is initiated, the liquid level in water supply tank 12 drops below the inlet of water supply line 14, and consequently water supply line 14 and mixing tank 16 fill with air as pump 34 continues to run.

After mixing tank 16 is completely emptied of wash solution and filled with air and when the aqueous wash solution in fluid delivery line 32 is pumped out, pump 34 fills with air. As a result, the downstream pressure of fluid in delivery conduit 40 drops, and switch 48, which senses this pressure drop by means of pressure indicating line 52, shuts off pump 34, thereby automatically stopping the operation of the apparatus.

When water delivery line 14 fills with air as described above, the partial vacuum created in aspirator 18 is destroyed. Consequently, the Cots-O-Dine or other concentrated iodophor sanitizer in iodophor delivery line 20 and iodophor conduit 24 slowly recede back into first cycle iodophor reservoir 26. And, if the inventive device is provided with the optional venting conduit 60, the return of the iodophor to its reservoir will be speeded since as soon as check valve 62 opens in response to the drop in fluid pressure in delivery conduit 40, air is admitted to venting conduit 60 thereby quickly destroying the partial vacuum in iodophor delivery line 20.

After pump 34 has stopped, and simultaneous to the return of the iodophor to its reservoir, the liquid level of the water in water supply tank 12 begins to rise until it reaches the predetermined value. At this time, the incoming water flow is shut off by the conventional liquid level control mechanism marking the end of the first cycle of operation of the inventive apparatus. The free end of delivery conduit 40 carrying spinner 42 is simply left in bulk milk holding tank 44 to await the second cycle of the cleansing process.

Immediately before the farmer is ready to fill newly obtained milk into the bulk milk holding tank, the second cycle of the washing process is initiated. This is accomplished by manually changing three way valve 22 so that iodophor delivery line 20 draws the concentrated iodophor sanitizer in second cycle iodophor reservoir 30 into aspirator 18. Then, button 54 on switch 48 is depressed so that pump 34 begins its action and the pressure in delivery conduit 40 begins to build. Thereafter, the apparatus operates in the same way as described above, the only difference being that the aqueous chemical wash solution is now made up from the concentrated iodophor contained in the second cycle iodophor reservoir 30 and not first cycle iodophor reservoir 26. After the second cycle of the inventive apparatus has been ended, the farmer can simply fill the tank with milk.

The inventive apparatus provides an extremely simple and inexpensive system for cleansing the interior of a bulk milk holding tank as well as other types of bulk fluid tanks. Because of its design, the inventive apparatus is capable of providing the proper sequence of rinse and wash steps without the use of involved and complicated timing mechanisms necessary in prior art systems. Consequently, the cost of making and selling the apparatus is significantly lower than other systems presently available.

In a preferred embodiment, the inventive bulk tank cleansing system contemplates that dairy tanks will be periodically subjected to a hot water rinse in addition to the above described cleansing operation. For this purpose, the inventive apparatus has been provided with auxiliary conduit 36 and vales 38 and 39. When a hot water wash is desired, the inlet opening to valve 38 is fluidly connected by appropriate tubing to drain 46 of bulk milk holding tank 44. The bulk milk holding tank is then partially filled with warm or hot water, and valve 38 is opened, valve 39 closed, and pump 34 started by depressing button 54 of switch 48. Hot water in the bulk tank will then be pumped from drain 46 through pump 34 and back into the bulk tank through spinner 42. The hot water wash continues for as long as desired at which time the pump can be stopped by shutting off the power or by disconnecting drain 46 from auxiliary conduit 36.

Another preferred embodiment of the inventive apparatus is also illustrated in the drawing wherein it is shown that attached to first cycle iodophor 24 is an iodophor holding tank 58. This holding tank is provided so that the iodophor sanitizer in first cycle iodophor reservoir 26 is momentarily delayed before it reaches aspirator 18. By appropriately selecting the size of this holding tank 58, the length of time for the water rinse step in the first cycle can therefore be adjusted as desired.

While only a single embodiment of the inventive apparatus has been described in the foregoing specification and drawings, it should be understood that many modifications can be made without departing from the spirit and scope of the invention. For example, water source 10 can be adapted to fill water supply tank 12 in each cycle only after pump 34 has stopped operating. In addition, only one iodophor reservoir can be employed instead of the two reservoirs as described above, the iodophor in the single reservoir being used for both the first and second chemical washes.

It should also be appreciated that a significant feature of the present invention is that the relative length of the preliminary water rinse in each cycle and the overall length of each cycle can be controlled by appropriate selection of the volume of various portions of the inventive apparatus. For example, the length of the preliminary water rinse of each cycle can be increased by increasing the volume of the fluid-containing portions of the apparatus between the mixing station and the pump. In addition, the total length of each cycle can be increased by simply increasing the volume of fluid supply tank 12 or by increasing the flow rate of incoming water to supply tank 12.

The foregoing description and drawing have been presented for illustrative purposes only and are not intended to limit the present invention in any way. All reasonable modifications not specifically set forth are intended to be included within the scope of the present invention, which is to be limited only by the following claims.

We claim:

1. Bulk tank cleansing apparatus comprising: a supply tank; pumping means fluidly connected to said supply tank for pumping fluid from said supply tank; an aspirator fluidly connected to and intermediate said pumping means and said supply tank, said aspirator adapted to mix a second fluid with the fluid flowing from said supply tank to said pumping means; distributing means fluidly connected to said pumping means for distributing fluid pumped through said pump; and switch means adapted to actuate said pump, said switch means responsive to the pressure of the fluid expelled by said pump, said switch means adapted to actuate said pump when either (a) said switch is independently actuated or (b) when the pressure of the fluid expelled by said pump exceeds a predetermined value.

2. Apparatus according to claim 1 further comprising a mixing tank fluidly connected to and intermediate said pump and said aspirator, said mixing tank positioned so that it is completely filled with fluid when said supply tank is filled with fluid.

3. Apparatus according to claim 2 wherein said mixing tank and said supply tank are connected by conduit means positioned so that it is completely filled with fluid when said supply tank is filled with fluid.

4. Apparatus according to claim 1 further comprising first reservoir means for holding a chemical wash composition, said first reservoir means fluidly attached to said mixing means aspirator.

5. Apparatus according to claim 4 further comprising a second reservoir means for holding a chemical wash composition, said second reservoir means fluidly attached to said aspirator.

6. Apparatus according to claim 5 further comprising a three way valve fluidly attached to said aspirator, said first chemical wash reservoir and said second chemical wash reservoir.

7. Apparatus according to claim 4 further comprising holding tank means fluidly connected to said aspirator.

8. Bulk tank cleansing apparatus comprising: a supply tank for supplying a predetermined quantity of fluid defining a full liquid level when in said tank; mixing means attached to said supply tank; a mixing tank fluidly connected to said mixing means and positioned so that it is completely filled with fluid when said supply tank is filled with said predetermined quantity of fluid; pumping means fluidly connected to said mixing tank and positioned vertically lower than said full liquid level so that said pump contains an amount of fluid when said supply tank is filled with said predetermined quantity of fluid; distributing means fluidly connected to said pumping means for distributing fluid pumped through said pumping means; first reservoir means attached to said mixing means for holding a chemical wash composition; and switch means responsive to the pressure of fluid expelled by said pump, said switch means adapted to actuate said pumping means when and only so long as said switch is manually actuated, except that said switch is adapted to remain actuated without manual actuation to thereby actuate said pump, after said switch is manually actuated and once the pressure of fluid expelled by said pump exceeds a predetermined value.

9. Bulk tank cleansing apparatus comprising: a supply tank for supplying a predetermined quantity of fluid; pumping means fluidly connected to said supply tank for pumping fluid from said supply tank; distributing means fluidly connected to said pumping means for distributing fluid pumped therethrough; and switch means adapted to actuate said pumping means; said switch means being responsive to the pressure of the fluid expelled by said pumping means and adapted to actuate said pumping means in response to manual actuation of said switch and only so long as said switch is manually actuated, except that once manually actuated and once the pressure of the fluid expelled by said pumping means increases and exceeds a predetermined value, said switch is adapted to remain actuated without manual actuation to thereby actuate said pumping means; said switch means being further adapted to become deactuated to thereby deactuate said pumping means when said predetermined quantity of fluid has passed through said pumping means and the pressure of the fluid expelled by said pumping means drops below said predetermined value.

10. Apparatus according to claim 9 further comprising a mixing tank fluidly connected to and intermediate said pumping means and said supply tank, said mixing tank positioned so that it is completely filled with fluid when said supply tank is filled with fluid.

11. Apparatus according to claim 10 wherein said mixing tank and said supply tank are connected by conduit means positioned so that said mixing tank is completely filled with fluid when said supply tank is filled with fluid.

12. Apparatus according to claim 10 further comprising mixing means connected to and intermediate said mixing tank and said supply tank, said mixing means adapted to mix a second fluid with the fluid flowing from said supply tank to said mixing tank.

13. Apparatus according to claim 12 wherein said mixing means is an aspirator.

14. Apparatus according to claim 12 further comprising first reservoir means for holding a chemical wash composition, said first reservoir means fluidly attached to said mixing means.

15. Apparatus according to claim 14 wherein said mixing means is an aspirator.

16. Apparatus according to claim 14 further comprising a second reservoir means for holding a chemical wash composition, said second reservoir means fluidly attached to said mixing means.

17. Apparatus according to claim 16 further comprising a three-way valve attached to said mixing means, said first chemical wash reservoir and said second chemical wash reservoir.

18. Apparatus according to claim 14 further comprising holding tank means fluidly connected to and intermediate said mixing means and said first reservoir means. of operation 19. Apparatus according to claim 9 further including supply means for automatically supplying said predetermined quantity of fluid to said supply tank for each cycle of operation of said apparatus.

* * * * *